Patented July 21, 1931

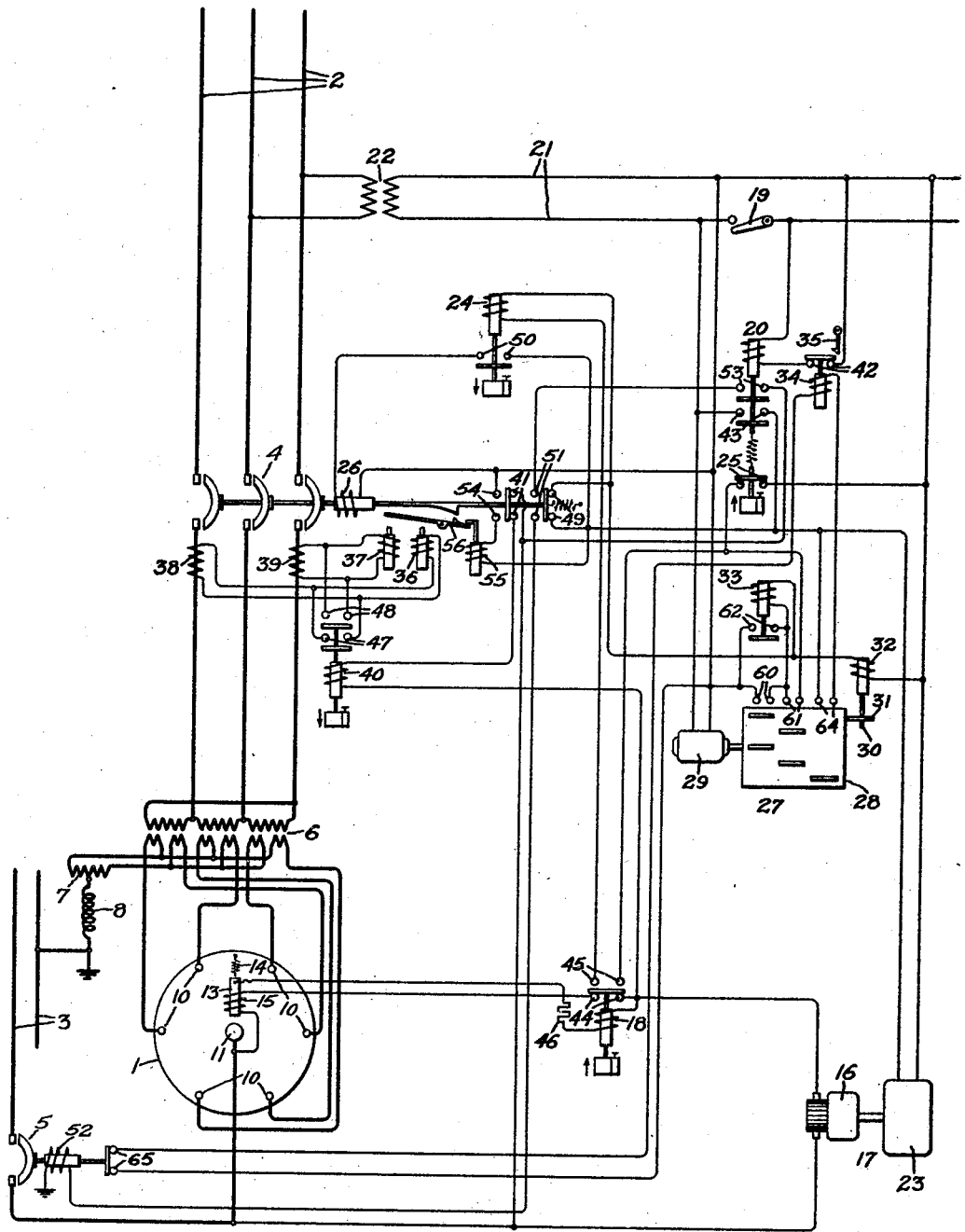

1,815,803

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed August 19, 1929. Serial No. 387,019.

My invention relates to automatic control equipments and particularly to automatic control equipments for mercury arc rectifiers and its object is to provide an arrangement of apparatus for effecting the immediate connection of the rectifier to a source of current in response to the establishment of an exciting arc in the rectifier when the rectifier is first started and for effecting any subsequent reconnection of the rectifier to the supply circuit while the equipment is in operation only after the rectifier has been disconnected from the supply circuit for a relatively long predetermined length of time. Such an arrangement is desirable in order to make use of the quick starting characteristic of a mercury arc rectifier.

My invention will be better understood from the following description when taken in connection with the accompanying drawings, which diagrammatically shows an automatic mercury arc rectifier control equipment which embodies my invention, and its scope will be pointed out in the appended claims.

Referring to the arrangement shown in the drawings, 1 represents a mercury arc rectifier which is arranged to be interconnected between an alternating current supply circuit 2 and a direct current load circuit 3 by means of suitable switches 4 and 5 respectively. In order to obtain the desired direct current voltage from the rectifier 1, a power transformer 6 is connected between the rectifier 1 and the alternating current supply circuit 2. The secondary windings of the power transformer 6 are connected in star and the neutrals thereof are connected through an interphase transformer 7 and a smoothing reactor 8 to the negative side of the direct current circuit 3 which, in the particular embodiment shown in the drawing, is the ground.

The rectifier 1 comprises a plurality of anodes 10, which are connected to secondary terminals of the power transformer 6, and a cathode 11 which is arranged to be connected to the positive side of the direct current circuit 3 by the switch 5.

Due to the characteristics of the mercury arc, current flows, after an arc has been established in the rectifier, from any anode 10 to the cathode 11 when the voltage of the anode is higher than that of the cathode but the current never flows in the reverse direction except under abnormal conditions. Since each anode is connected to one end of a separate secondary winding of the power transformer 6, the other end of which is connected to the negative or grounded side of the load circuit by means of the interphase transformer 7 and reactor 8, each anode during a portion of each cycle of the alternating current has a potential higher than any one of the other anodes and during that period allows a current to flow to the cathode across the mercury arc after it has once been started.

As the mercury arc is not self-starting, some form of arc establishing means, examples of which are well known in the art, has to be provided. In the present embodiment of my invention I have shown the rectifier as being provided with an auxiliary or arc striking anode 13 for establishing the arc. This anode 13 is normally held out of engagement with the mercury by means of a spring 14 and is arranged to be moved into engagement with the mercury by means of a solenoid 15 which when energized places the spring 14 under tension. When the anode 13 engages the mercury a circuit from a suitable source of current, shown in the drawing as the generator 16 of a motor generator set 17, is completed through a control relay 18 which, when energized, effects the deenergization of the solenoid 15 so that the spring 14 draws the striking anode 13 out of the mercury and thereby establishes an exciting arc in the rectifier. After the exciting arc has been established the switches 4 and 5 are successively closed so that current flows from the anodes 10 to the cathode 11 of the rectifier and in this manner energy is transferred from the alternating current supply circuit 2 to the direct current load circuit 3.

In accordance with the embodiment of my invention shown in the drawings, the normal starting and stopping of the rectifier 1 is effected by the closing and opening of a hand switch 19 in the circuit of a master control device 20. Any other suitable control means, examples of which are well known in the art, may be employed instead of or in addition to the manually controlled switch 19 to control the energization of the master relay 20 to effect the starting and stopping of the rectifier 1.

As shown in the drawings, the closing of the control switch 19 completes the circuit of the master control relay 20 across a suitable control circuit 21 which is connected to the secondary winding of a control transformer 22 the primary of which is connected across the supply circuit 2. The energization of the master control relay 20 initiates the starting of the motor 23 of the motor generator set 17 so that the operation of the arc establishing means is effected to establish an exciting arc in the rectifier 1.

In accordance with my invention, I provide an arrangement for immediately closing the switch 4 if the exciting arc is established in the rectifier 1 within a predetermined time after the master relay 20 is energized. In the particular embodiment shown in the drawings, this result is obtained by having the relay 18, which is energized as long as an exciting arc exists in the rectifier 1, complete an energizing circuit for the control relay 24 which is arranged in any suitable manner so as to be opened after the relay 20 has been energized a predetermined length of time. As shown in the drawings, this energizing circuit for the relay 24 includes contacts 25 of the master relay 20 which are arranged to be opened after the relay has been energized a predetermined length of time. The control relay 24 when energized effects the energization of the closing coil 26 to close the switch 4. With this arrangement, it will be observed that if the exciting arc is established after the coil of the master relay 20 is energized and before the contacts 25 of the relay 20 are opened, the switch 4 is immediately closed after the exciting arc is established.

The construction of the operating mechanism for the switch 4 embodies an arrangement, examples of which are well known in the art, such that the switch cannot be reclosed within a definite time after each closing operation. This time is longer than that required for contacts 25 to open so that an immediate reclosure cannot take place in case the switch opens before the contacts 25 are opened.

In order to effect the reclosing of the switch 4 a plurality of times with relatively long predetermined time intervals between successive reclosures when the switch 4 is opened while the equipment is in operation and for locking out the equipment if the switch 4 does not remain closed after being reclosed a predetermined number of times, I also provide a timing device 27 the operation of which is controlled by the energization of the master control relay 20 and the position of the switch 4. As shown in the drawings, the timing device 27 comprises a timer 28 which is driven by a motor 29 permanently connected across the control circuit 21. The motor 29 is normally prevented from rotating the timer 28 by a stop 30 which engages a projection 31 on the timer 28. The stop 30, however, is arranged to be moved out of engagement with the projection 31 by means of a release magnet 32, the circuit of which is arranged to be completed when the master relay 20 is energized and the switch 4 is open. During each revolution of the timer 28, it is arranged to effect, in case the exciting arc has been established, a predetermined number of closures of the switch 4 with predetermined time intervals between the successive reclosures by successively effecting the energization of the control relays 33 and 24. As shown in the drawings the timer 28 is arranged to effect two closures of the switch 4 during each revolution of the timer but it is obvious to those skilled in the art that the timer can be designed to effect any desired number of closures.

In case the arc establishing means fails to establish an exciting arc or some other abnormal condition occurs so that the switch 4 is open at the end of a predetermined time interval after the operation of the timing device 27 is effected, the timer 28 is arranged to effect the operation of a lockout relay 34 to lock out the equipment against further automatic operation. As shown in the drawings the lockout relay 34, when energized, opens the energizing circuit of the master relay 20 which, when deenergized, effects the shutting down of the control equipment. The lockout relay is arranged in any suitable manner, examples of which are well known in the art, so that it prevents the energizing circuit of the master relay 20 from being subsequently completed, when the control switch 19 is closed, until after the lockout relay has been reset manually. As shown in the drawings, the lockout relay 34 is of the type which is held in its energized position by a manually releasable latch 35.

In order to protect the rectifier against overloads and arc backs, the switch 4 is provided with overload trip coils 36 and 37 which are respectively energized from current transformers 38 and 39. The transformers 38 and 39 are respectively connected so that they are energized in response to the currents flowing in two of the phases of the supply circuit 2. Since the inrush or transient current of the power transformer 6 at the instant the switch 4 is closed, under normal conditions, may be several times the normal current and may last through several cycles, it is necessary to prevent the trip coils 36 and 37 from effecting the opening of the switch 4 until after this transient has disappeared. In the particular arrangement shown in the drawing, this result is obtained by providing a relay 40 which is arranged to short-circuit the coils 36 and 37 before the switch 4 is closed and which is arranged to maintain the coils 36 and 37 short-circuited for a predetermined time after the switch 4 is closed. This result is obtained by connecting the relay 40 and auxiliary contacts 41 on the switch 4 which are open when the switch 4 is closed, across the generator 16 of the motor generator 17 and designing the relay 40 in any suitable manner, examples of which are well known in the art so that it does not open its contacts until after the relay coil has been deenergized for a predetermined length of time.

The operation of the arrangement shown in the drawing is as follows: When it is desired to place the rectifier in operation, the control switch 19 is closed so that the master relay 20 and the normally closed contacts 42 of the lockout relay 34 are connected in series across the control circuit 21. The master relay 20, by closing its contacts 43, connects the motor 23 of the motor generator set 17 across the supply circuit 21 so that the motor generator set is started to effect the establishment of an exciting arc in the rectifier 1. As soon as the voltage of the generator 16 of the motor generator set 17 builds up to a predetermined value the solenoid 15 of the arc establishing means is sufficiently energized to move the striking anode 13 into engagement with the mercury of the rectifier 1. The energizing circuit of the solenoid 15 also includes the contacts 44 of the control relay 18. As soon as the striking anode 13 engages the mercury in the rectifier, current flows through the coil of the control relay 18 so that the relay opens its contacts 44 and closes its contacts 45. The opening of the relay contacts 44, which are in the circuit of the solenoid 15, effects the deenergization of the solenoid 15 so that the spring 14 moves the striking anode 13 out of engagement with the mercury and thereby establishes an exciting arc in the rectifier. Since the arc resistance is low, sufficient current flows through the arc between the striking anode 13 and the mercury to maintain the control relay 18 in its energized position after the arc is established. In order to limit the current through the coil of the relay 18, it may be desirable in some cases to connect a suitable resistor 46 in series with the relay coil.

The building up of the voltage of the generator 16 also effects the energization of the relay 40 which, by closing its contacts 47 and 48, short-circuits the overload trip coils 36 and 37 respectively so that the inrush current to the transformer 6, when the switch 4 is subsequently closed, does not effect the opening of the switch 4.

As soon as the relay 18 becomes energized and closes its contacts 45 in response to the operation of the arc establishing means, a circuit is completed for the control relay 24 to effect the immediate closing of the switch 4. This energizing circuit for the control relay 24 is from one side of the control circuit 21 through contacts 43 of the master relay 20, auxiliary contacts 49 of switch 4, coil of relay 24, contacts 45 of the relay 18, time-delayed contacts 25 of the master relay 20 to the other side of the control circuit 21. The relay 24 by closing its contacts 50 completes across the control circuit 21 an energizing circuit for the closing coil 26 to effect the closing of the switch 4 so that the rectifier 1 is connected to the supply circuit 2.

When the switch 4 closes, its auxiliary contacts 51 complete an energizing circuit for the closing coil 52 of the switch 5 across the direct current terminals of the rectifier 1 so that the switch 5 is closed to connect the rectifier to the direct current load circuit 3 if the direct current voltage of the rectifier is above a predetermined value. The circuit of the closing coil 52 also includes the contacts 53 of the master relay 20.

When the switch 4 closes, its auxiliary contacts 54 complete across the control circuit 21 an energizing circuit for the undervoltage trip coil 55 for the switch 4 so that the latch 56 is free to maintain the switch 4 closed after the closing coil 26 is deenergized by the control relay 24 when its circuit is opened by the auxiliary contacts 49 on the switch 4.

The switch 4 by opening its auxiliary contact 41 effects the deenergization of the relay 40, which after a predetermined time interval opens its contacts 47 and 48 and renders the overcurrent trip coils 36 and 37 operative to open the switch 4.

It will be observed from the above description that if the exciting arc is established in the rectifier 1 within a predetermined time after the coil of the master relay 20 is energized, the switch 4 is immediately closed after the arc is established to connect the rectifier to the supply circuit 2.

The closing of the contacts 43 of the master relay 20 in addition to initiating the operation of the arc establishing means also completes an energizing circuit for the release magnet 32 of the timing device 27 so that the operation of the timing device 27 is initiated to close the switch 4 in case it does not remain closed after the initial reclosure thereof and to lock out the equipment if the starting operation is not completed within a predetermined time interval after the master relay 20 is energized or the switch 4 fails to remain closed after being reclosed a predetermined number of times.

The energizing circuit of the release magnet 32 which is completed across the control circuit 21 by the closing of the contacts 43 also includes the auxiliary contacts 49 on the switch 4 so that the release magnet 32 is not energized when the timer 28 is in its normal position and the switch 4 is closed. Therefore, under normal operating conditions, the timer 28 remains in its normal position.

When the release magnet 32 is energized, it withdraws the stop 30 out of engagement with the projection 31 so that the motor 29 can produce one revolution of the timer 28. During this single revolution of the timer 28, it is arranged to successively close its contacts 60 and 61 with predetermined time intervals between successive closures of the contacts. The initial closing of the contact 60, however, does not take place until after sufficient time has elapsed to allow the master relay contacts 25 to open. Therefore, under normal operating conditions the initial closing of the timer contacts 60, when the rectifier is first started, does not occur until after the switch 4 has been closed. Consequently, if the switch 4 remains closed after the initial closing thereof of successive closures of the timer contacts 60 and 61 do not effect the energizations of the relays 33 and 24. The timer 28 merely continues its rotation until it reaches its normal position where it is stopped by the stop 30 engaging the projection 31 since the circuit of the release magnet 32 is open at the auxiliary contacts 49 on the switch 4.

If the switch 4 is opened, in response to either an overload or any other abnormal condition while the rectifier is in operation, the closing of the auxiliary contacts 49 on the switch 4 effects, in the manner above described, the energization of the release magnet 32 so that the operation of the timer 28 is effected. After a predetermined time interval, the timer 28 closes its contacts 60 and completes across the control circuit 21 an energizing circuit for the control relay 33 since the auxiliary contacts 49 of the switch 4 and the contacts 43 of the master control relay 20 are closed. The control relay 33, when energized, completes a locking circuit for itself through its contacts 62 so that the relay is not deenergized when the timer 28 subsequently opens its contacts 60 and closes its contacts 61. The subsequent closing of the timer contacts 61 completes across the control circuit 21, when the control relay 33 is energized, an energizing circuit for the control relay 24 which when energized effects in the manner above described the closing of the switch 4 and the subsequent closing of the switch 5 which was opened in response to the opening of the switch 4. This energizing circuit for the control relay 24 includes the contacts 43 of the master control relay 20, the auxiliary contacts 49 on the switch 4, coil of the relay 24, contacts 45 of the relay 18, contacts 61 of the timer 28 and contacts 62 of the control relay 33.

If the switch 4 remains closed after the first reclosure thereof, the timer 28 returns to its normal position without effecting the operation of the control relay 33 when it again closes its contacts 60 during its return movement. If, however, the switch 4 does not remain closed, the subsequent closing of the timer contacts 60 and 61 effects in a manner above described another reclosure of the switch after it has been opened a predetermined length of time. If the switch 4 fails to remain closed after its second reclosure, the timer 28 is arranged to lock out the rectifier 1. This result is accomplished by providing the timer 28 with the contacts 64 which are closed just prior to the timer reaching its normal position.

If the switch 5 is open so that its auxiliary contacts 65 are closed when the timer 28 closes its contacts 64, a circuit, which also includes the contacts 43 of the master relay 20 is completed across the control circuit 21 for the lockout relay 34. The lockout relay 34 by opening its contacts 42 in the energizing circuit of the master relay 20 effects the deenergization of the master relay and locks out the equipment by preventing the master relay 20 from being energized in response to the operation of the control relay 20 until the latch 35 of the lockout relay has been reset manually.

From the above description of the operation it will be seen that when the rectifier is first placed in operation, the switch 4 is closed immediately after the exciting arc is established and without waiting for the first closing operation of the timing device 28 to occur. After the rectifier has been placed in operation, however, any subsequent reclosure of the switch 4, such as occurs after the switch has been opened in response to an overload, can take place only after the timing device 28 has been in operation for a relatively long predetermined length of time. By means of my invention the time delay of the timing device 28 is eliminated during the starting operation and, therefore, the time required to get the rectifier into the service is greatly decreased.

Under normal operation conditions the rectifier 1 is shut down by the opening of the control switch 19 which deenergizes the master relay 20. The master relay 20 by opening its contacts 43 and 53 effects the deenergization of the low voltage trip coil 55 of the switch 4 and the closing coil 52 of the switch 5 so that the rectifier is disconnected from the supply circuit 2 and the load circuit 3. The exciting arc is extinguished by the stopping of the motor generator set 17 which is effected by the opening of the contacts 43 of the master relay 20 in the energizing circuit of the motor 23.

While I have, in accordance with the Patent Statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an electric circuit, a mercury arc rectifier, a switch for connecting said rectifier to said circuit, means for establishing an exciting arc in said rectifier, and means for effecting the closing of said switch immediately after the exciting arc is established in said rectifier and for effecting any subsequent reclosure of said switch while said exciting arc is established only after a relatively long time interval has elapsed after the opening of the switch.

2. In combination, an electric circuit, a mercury arc rectifier, a switch for connecting said rectifier to said circuit, means for establishing an exciting arc in said rectifier, a control device for effecting the operation of said arc establishing means, and means for effecting the closing of said switch immediately after the exciting arc is established when said arc is established within a predetermined time after the operation of said control device and for effecting after said predetermined time and while said exciting arc is established a reclosure of said switch only at the end of a definite time interval after the initial operation of the control device.

3. In combination, an electric circuit, a mercury arc rectifier, a switch for connecting said rectifier to said circuit, means for establishing an exciting arc in said rectifier, a control device for effecting the operation of said arc establishing means, means including a timing device controlled by said switch and control device for effecting after a predetermined time interval the closing of said switch when it is open subsequently to the operation of said control device, and means responsive to the establishment of an arc in said rectifier within a predetermined time after the operation of said control device for effecting independently of said timing device the immediate closing of said switch.

4. In combination, an electric circuit, a mercury arc rectifier, a switch for connecting said rectifier to said circuit, means for establishing an exciting arc in said rectifier, a master relay for controlling the operation of said arc establishing means, starting means for effecting the operation of said relay to effect the operation of said arc establishing means, a timing device controlled by said relay and switch for effecting after predetermined time intervals the closing of said switch a plurality of times, and means controlled by said master relay for effecting the immediate closing of said switch when an arc is established in said rectifier within a predetermined time after the operation of said relay is effected by said starting means.

5. In combination, an electric circuit, a mercury arc rectifier, a switch between said rectifier and circuit, overload responsive means for opening said switch, means for establishing a starting arc in said rectifier, and means for effecting the immediate closing of said switch in response to the establishment of the exciting arc in said rectifier and for effecting only after a relatively long time interval a reclosure of said switch when opened by said overload responsive means.

6. In combination, an electric circuit, a mercury arc rectifier, a switch between said rectifier and circuit, overload responsive means for opening said switch, means for establishing a starting arc in said rectifier, a control device for effecting the operation of said arc establishing means, and means for effecting the immediate closing of said switch when an arc is established in said rectifier within a predetermined time after the operation of said control device and for effecting only after a relatively long time interval a reclosure of said switch when opened by said overload responsive means subsequently to the initial closing of said switch.

7. In combination, an electric circuit, a mercury arc rectifier, a switch between said rectifier and circuit, overload responsive means for opening said switch, means for establishing an arc in said rectifier, a master relay for controlling the operation of said arc establishing means, starting means for effecting the operation of said relay to effect the operation of said arc establishing means, means for effecting the immediate closing of said switch when an arc is established in said rectifier within a predetermined time after the operation of said master relay is effected by said starting means and timing means controlled by said switch and relay for effecting only after a relatively long time interval the closing of said switch when said switch is opened while said relay is operated to effect the operation of the arc establishing means.

8. In combination, an electric circuit, a mercury arc rectifier, a switch between said rectifier and circuit, overload responsive means for opening said switch, means for establishing an arc in said rectifier, a master relay for controlling the operation of said arc establishing means, starting means for effecting the operation of said relay to effect the operation of said arc establishing means, means controlled by said relay and arc establishing means for effecting the immediate closing of said switch when an arc is established in said rectifier within a predetermined time after the operation of said master relay is effected by said starting means, and timing means controlled by said switch and relay for effecting the closing of said switch a plurality of times with predetermnied time intervals between reclosures when said switch is opened by said overload responsive means after said relay has been operated a predetermined length of time.

9. In combination, an electric circuit, a mercury arc rectifier, a switch for connecting said rectifier to said circuit, and automatic control means for effecting the starting and stopping of said rectifier including means for establishing an arc in said rectifier, and means for effecting the initial closing of said switch immediately after the exciting arc is established during the starting operation and for effecting only after a predetermined time interval any subsequent reclosure of said switch while said exciting arc is established.

In witness whereof, I have hereunto set my hand this 15th day of August, 1929.

HAROLD T. SEELEY.